(12) United States Patent
Adams

(10) Patent No.: US 7,876,261 B1
(45) Date of Patent: Jan. 25, 2011

(54) REFLECTED WAVE CLOCK SYNCHRONIZATION

(75) Inventor: Gregory F. Adams, Morristown, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 39 days.

(21) Appl. No.: 12/259,573

(22) Filed: Oct. 28, 2008

(51) Int. Cl.
*G01S 13/00* (2006.01)
*G01S 7/40* (2006.01)
*H04B 7/00* (2006.01)

(52) U.S. Cl. .................. 342/88; 342/82; 342/165; 342/173; 342/174; 455/265

(58) Field of Classification Search ............ 342/82–88, 342/165, 173, 174; 455/208, 265
See application file for complete search history.

(56) References Cited

U.S. PATENT DOCUMENTS

| | | | | |
|---|---|---|---|---|
| 3,739,287 A * | 6/1973 | Johnson | ........................ | 327/10 |
| 3,798,650 A * | 3/1974 | McComas et al. | ........... | 375/356 |
| 3,942,124 A * | 3/1976 | Tarczy-Hornoch | .......... | 327/154 |
| 4,096,448 A * | 6/1978 | Hayes | ........................ | 372/18 |
| 4,198,604 A * | 4/1980 | Holdaway | ................... | 455/260 |
| 4,641,107 A | 2/1987 | Kalokitis | | |
| 4,780,685 A | 10/1988 | Ferguson | | |
| 4,835,480 A * | 5/1989 | Skupen et al. | ............... | 342/135 |
| 4,885,590 A | 12/1989 | Hasan | | |
| 4,965,530 A | 10/1990 | Katz | | |
| 4,968,968 A * | 11/1990 | Taylor | ........................ | 342/174 |
| 5,003,314 A * | 3/1991 | Berkowitz et al. | .......... | 342/372 |
| 5,017,927 A | 5/1991 | Agrawal et al. | | |
| 5,103,233 A | 4/1992 | Gallagher et al. | | |
| 5,151,702 A | 9/1992 | Urkowitz | | |
| 5,157,403 A | 10/1992 | Urkowitz | | |
| 5,309,161 A | 5/1994 | Urkowitz et al. | | |
| 5,343,208 A | 8/1994 | Chesley | | |
| 5,361,277 A * | 11/1994 | Grover | ........................ | 375/356 |
| 5,376,939 A | 12/1994 | Urkowitz | | |
| 5,412,414 A * | 5/1995 | Ast et al. | ..................... | 342/174 |
| 5,414,428 A | 5/1995 | Gallagher et al. | | |
| 5,440,311 A | 8/1995 | Gallagher et al. | | |
| 5,481,270 A | 1/1996 | Urkowitz et al. | | |
| 5,682,112 A * | 10/1997 | Fukushima | ................. | 327/147 |
| 5,907,253 A * | 5/1999 | Davis et al. | .................. | 327/156 |
| 5,952,955 A * | 9/1999 | Kennedy et al. | ........... | 342/25 F |
| 5,982,238 A * | 11/1999 | Soderquist | ..................... | 331/2 |
| 6,081,226 A * | 6/2000 | Caldwell et al. | ............ | 342/200 |

(Continued)

OTHER PUBLICATIONS

U.S. Appl. No. 11/590,402, Ehert et al.

(Continued)

*Primary Examiner*—Thomas H Tarcza
*Assistant Examiner*—Peter M Bythrow
(74) *Attorney, Agent, or Firm*—Duane Morris LLP

(57) ABSTRACT

A radar system has a phased-array antenna and plural local oscillators for controlling local transmit/receive units. The local oscillators are slaved to a master oscillator. The analog clock signal paths are subject to relative changes in electrical length. The electrical lengths of the signal paths are measured by phase-detecting forward- and reverse-direction clock signal flows. The phase-detected information for each signal path is a measure of the time delay. The radar command processor receives the measure of time delay and corrects the radar operation in response thereto.

10 Claims, 7 Drawing Sheets

U.S. PATENT DOCUMENTS

| | | | |
|---|---|---|---|
| 6,084,540 | A | 7/2000 | Yu |
| 6,184,820 | B1 | 2/2001 | Kratzer |
| 6,469,671 | B1 | 10/2002 | Pluymers et al. |
| 6,483,478 | B2 | 11/2002 | Yu |
| 6,639,546 | B1 | 10/2003 | Ott et al. |
| 6,639,950 | B1 * | 10/2003 | Lagerblom et al. .......... 375/297 |
| 6,861,974 | B1 | 3/2005 | Poe et al. |
| 6,995,638 | B1 | 2/2006 | Smith et al. |
| 7,081,848 | B1 | 7/2006 | Adams |
| 7,463,710 | B2 * | 12/2008 | Walsh et al. ................. 375/376 |
| 7,489,168 | B2 * | 2/2009 | Lee ............................ 327/157 |
| 7,492,850 | B2 * | 2/2009 | Menolfi et al. .............. 375/376 |
| 7,570,201 | B1 * | 8/2009 | Watkins et al. .............. 342/174 |
| 2002/0016154 | A1 * | 2/2002 | Huttunen ..................... 455/63 |
| 2003/0199262 | A1 * | 10/2003 | Chung ........................ 455/265 |
| 2007/0087704 | A1 * | 4/2007 | Gilberton ................. 455/114.3 |
| 2007/0131078 | A1 * | 6/2007 | Kokkeler .......................... 84/1 |
| 2007/0210955 | A1 * | 9/2007 | McEwan ..................... 342/175 |
| 2007/0260906 | A1 * | 11/2007 | Corredoura ................. 713/400 |
| 2009/0180466 | A1 * | 7/2009 | Soul et al. ................... 370/350 |

OTHER PUBLICATIONS

Skolnik, Merrill "Attributes of the Ubiquitous Phased Array Radar", IEEE Phased Array Systems and Technology Symposium, Oct. 14-17, 2003.

* cited by examiner

REFLECTED WAVE CLOCK SYNCHRONIZATION

BACKGROUND OF THE INVENTION

Radar systems are widely known. Early radar systems used vacuum tubes in analog circuits, and were subject to reliability problems. In particular, the vacuum tubes would age with time, and the operating parameters of the radar system would vary on an almost continuous basis, requiring constant realignment. When left in operation, the many vacuum tubes of a radar system would give rise to frequent failures attributable to normal aging and often excessive heat. If turned off when not in use, the thermal cycling would often result in tube failures at each turn-on, requiring trouble-shooting and maintenance.

With the advent of solid-state devices, some of the low-frequency, low-power functions of a radar system could be converted away from tubes. This often provided a major improvement in reliability. The introduction of integrated circuits gave impetus for their use in the low-frequency, low-power sections of a radar system, and also gave impetus to the nascent field of digital signal processing.

Digital signal processing gained dominance in the field of radar signal processing, and advanced or special-purpose integrated circuits were developed to handle high frequencies. Solid-state devices have been limited, however, in their ability to handle the large amounts of power required for radar transmissions. This problem has been partially solved by dividing the power to be transmitted among a plurality of solid-state amplifiers, each of which provides transmit power to one or a few antenna elements of an active array antenna. Examples of such solid-state amplifiers appear in U.S. Pat. Nos. 4,601,106 and 4,641,107, issued Feb. 3, 1987 to Kalokitis; 4,780,685 issued Oct. 25, 1988 to Ferguson; and 4,965,530 issued Oct. 23, 1990 to Katz. Solid-state amplifiers are often found embedded within transmit-receive (T/R) modules. Such TR modules are described, for example, in U.S. Pat. No. 5,017,927, issued May 21, 1991 to Agrawal et al. The use of many such these T/R modules in a limited space gives rise to heat removal or temperature problems, and an art, exemplified by U.S. Pat. No. 6,469,671, issued Oct. 22, 2002 to Pluymers et al., has arisen to configure such systems for convenient heat removal.

The design of radar systems involves a complex tradeoff among many factors, among which are system complexity, cost, weight, performance, and reliability. Some of the problems, issues and considerations challenging the design of radars in various contexts are described or addressed in many publications, as for example in U.S. Pat. Nos. 4,885,590 issued Dec. 5, 1989 to Hasan; 5,103,233 issued Apr. 7, 1992 to Gallagher et al.; 5,151,702, issued Sep. 29, 1992 to Urkowitz; 5,157,403 issued Oct. 20, 1992 to Urkowitz; 5,309,161 issued May 3, 1994 to Urkowitz et al.; 5,343,208 issued Aug. 30, 1994 in the name of Chesley; 5,376,939 issued Dec. 27, 1994 to Urkowitz; 5,414,428 issued May 9, 1995 to Gallagher et al.; 5,440,311 issued Aug. 8, 1995 to Gallagher et al.; 5,481,270 issued Jan. 2, 1996 to Urkowitz et al.; 6,084,540 issued Jul. 4, 2000 to Yu; 6,184,820 issued Feb. 6, 2001 to Kratzer; 6,483,478 issued Nov. 19, 2002 to Yu; 6,639,546 issued Oct. 28, 2003 to Ott et al.; 7,081,848 issued Jul. 25, 2006 to Adams; and 6,861,974 issued Mar. 1, 2005 to Poe et al. The problems associated with radar system design are more numerous and complex than might be thought. As an example of problems which are not signal processing problems, U.S. Pat. No. 6,995,638, issued Feb. 7, 2006 in the name of Smith et al. describes a structural augmentation arrangement which is intended to aid in maintaining reliability attributable to physical flexure or movement between a transmitter and an associated antenna. Among other problems associated with radar system design are that the beamformers, circulators (if any), T/R modules, and filters (if any) associated with each elemental antenna of the antenna array tend to be physically large. It is very desirable to be able to set the inter-antenna-element spacing based on operational factors such as operating frequency, beam width, sidelobe level, grating lobes, and the like. The large size of the T/R modules tends to make selection of an appropriate inter-antenna-element spacing difficult. This problem has been addressed by selecting an appropriate inter-antenna-element spacing, and in a related fashion, by feeding groups of antenna elements in common.

Currently the most advanced radar systems rely on a plurality of array elements with associated T/R modules. Each T/R module includes circuitry that provides an analog modulation of an RF signal's phase characteristics. Each T/R module includes circuitry that provides an analog modulation of an RF signal's amplitude characteristics. After these modulations are performed, an RF beamformer is required to sum the module's individual signals to form a beam with directional gain. These analog modulation devices and analog beamformers are expensive, require considerable space, and must be cooled. If multiple simultaneous beams are required, a plurality of these circuits is needed in the same space, compounding the shortcomings of the architecture. Additionally, to control these analog circuits, multi-bit digital control signals must be sent to each circuit at a specified rate. This requires a computational source to generate the signals and a network to distribute them in a timely manner.

A radar system is described in U.S. Pat. No. 7,492,313 to Ehret et al., entitled Digital Processing Radar System. As described therein, a radar system comprises a first plurality of arrayed elemental antennas forming an array and a plurality, equal in number to the first plurality, of digital transmitting signal generating means. The radar system also includes a plurality, equal in number to the first plurality, of receive digital signal processing means and a plurality, equal in number to the first plurality, of monolithic mixed-signal integrated circuit (MMIC) combination digital-to-analog and analog-to-digital conversion means, each digital-to-analog conversion means (DAC) including a digital input port and an analog output port, and each analog-to-digital conversion means (ADC) including an analog input port and a digital output port. The radar system further includes a plurality, equal in number to the first plurality, of monolithic microwave integrated circuit (MMIC) transceivers, each of the MMIC transceivers including (a) a transmit analog signal input port coupled to an upconverter for upconverting analog signals to be transmitted, a transmit amplifier coupled to the upconverter for receiving upconverted signals to be transmitted and for generating at an analog transmit signal output port analog signals to be transmitted and (b) an analog receive signal input port coupled to a receive amplifier for generating amplified receive signals, and a downconverter coupled for receiving the amplified receive signals, for generating at an analog receive signal output port downconverted analog receive signals. The radar system also includes means for coupling each of the digital transmitting signal generating means to the digital input port of a corresponding one of the digital-to-analog conversion means, whereby analog transmit signals appear at the analog output port of the digital-to-analog conversion means. Means are provided for coupling the analog output port of each of the digital-to-analog conversion means to the analog transmit signal input port of a corresponding one of the transceivers, whereby analog signals to be transmitted are generated at the analog transmit signal output port. A plurality, equal in number to the first plurality, of transmit-receive switches are provided. Each of the switches includes a common port and also includes individual transmit and receive ports, with the common port of each of the transmit-receive switches being coupled to a corresponding elemental antenna of the array. The radar system further includes means for coupling the analog transmit signal output port of each of the transceivers to a corresponding transmit port of a corresponding one of the switches, whereby, when the corresponding one of the switches is conditioned for transmission, coupling the analog signals to be transmitted from the analog transmit signal output port of the corresponding transceiver to the corresponding elemental antenna of the array. Means are provided for coupling the receive signal port of each of the transmit-receive switches to the analog receive signal input port of the corresponding one of the transceivers, thereby, when the corresponding one of the switches is conditioned for reception, coupling receive signals from the corresponding one of the elemental antennas to the analog receive signal output port of the corresponding one of the transceivers. Means are also provided for coupling the analog receive signal output port of the corresponding one of the transceivers to the analog input port of the corresponding one of the combination digital-to-analog and analog-to-digital conversion means, whereby digital receive signals are generated at the digital output port of the combination digital-to-analog and analog-to-digital conversion means. Means are further provided for coupling the digital output port of the combination digital-to-analog and analog-to-digital conversion means to the receive digital signal processing means. Radar control means are coupled to the digital transmitting signal generating means, to the receive digital signal processing means, and to the switches, for controlling the digital transmitting signal generating means for generating transmit signals during those intervals in which the switch means are conditioned for transmission, and for controlling the digital signal processing means during those intervals in which the switch means are conditioned for reception.

In a particular embodiment of this system, the common port of each of the transmit-receive switches is coupled to a corresponding elemental antenna of the array by means of a filter, which may be a bandpass filter. In an especially advantageous version or arrangement, each of the transceivers conforms to at least single-band IEEE 802-11 WLAN standards. In another advantageous version, each of the transceivers conforms to dual-band 802.11a/g standards at 2.4 to 2.5 GHz and 4.9 to 5.87 GHz.

A radar system as described by Ehret et al. comprises an array including a first plurality of antenna elements, and a plurality, equal in number to the first plurality, of transmit-receive means, each of the transmit-receive means including a common port and first and second individual ports, the common port of each of the transmit-receive means being coupled to an associated antenna element of the array of antenna elements. The transmit-receive means may be a controllable switch or a circulator. In this system, a plurality, equal in number to the first plurality, of COTS MMIC transceivers are provided, each of the transceivers comprising a transmit channel, a receive channel, and a transmit-frequency oscillator for producing transmit-frequency signals. The transmit channel comprises I and Q transmit modulators defining I and Q input ports, each of the I and Q transmit modulators being coupled to receive mutually-quadrature-phase versions of the transmit-frequency signals at the input ports of the I and Q transmit modulators, for generating upconverted I and Q transmit signals at the transmit frequency. The transmit channel further comprises a transmit amplifier coupled to output ports of the transmit I and Q modulators for generating amplified transmit signals. The transmit amplifier may be differential. The receive channel comprises a receive amplifier and receive I and Q modulators. Each of the receive I and Q modulators includes an input port coupled to the receive amplifier for receiving amplified receive signal therefrom. Each of the receive I and Q modulators is coupled to receive mutually-quadrature-phase versions of the transmit-frequency signals for generating downconverted I and Q receive signals at output ports of the receive I and Q modulators. The receive channel further includes amplifying means for amplifying the downconverted I and Q receive signals. A plurality, equal in number to the first plurality, of COTS MMIC power amplifiers is provided, each of the power amplifiers including an input port coupled to the output port of the transmit amplifier of an associated one of the transceivers and an output port coupled to the first individual port of an associated one of the transmit-receive means. Coupling means are coupled to the second individual port of an associated one of the transmit-receive means and to the input port of the receive amplifier, for coupling analog received signal to the receive amplifier. A plurality, equal in number to the first plurality, of COTS MMIC combination digital/analog converters are provided. Each of the combination digital/analog converters includes digital-to-analog (DAC) converters coupled to receive digital control signals, for converting the digital control signals into corresponding analog I and Q modulation signals. Each of the combination digital/analog converters further includes analog-to-digital conversion means (ADCs), for converting applied analog I and Q signals into corresponding digital signals. Coupling means interconnect the digital-to-analog converters (DACs) of each of the combination digital/analog converters with the transmit I and Q modulators of an associated one of the transceivers, for coupling the analog I and Q modulation signals thereto. Coupling means interconnect the analog-to-digital converters (ADCs) of each of the combination digital/analog converters to receive the downconverted I and Q receive signals from the receive I and Q modulators of the associated one of the transceivers. Digital control and processing means are coupled to the analog-to-digital converters (ADCs), and to the digital-to-analog converters (DACs) of the radar system, for generating digital signals representing transmit signals, and for applying the digital signals representing transmit signals to the digital-to-analog converters (DACs) of the radar system in a transmit mode of operation, and for receiving digital signals from the analog-to-digital converters (ADCs) in a receive mode of operation.

In a particularly advantageous arrangement of this radar system, Each of the COTS MMIC transceivers further comprises bandpass filter means coupled to the input ports of the transmit I and Q modulators for filtering the analog I and Q modulation signals applied to the transmit I and Q modulators. In another advantageous arrangement, each of the transceivers further comprises bandpass filter means coupled to the output ports of the receive I and Q modulators for reducing aliasing in the downconverted I and Q receive signals. In a particularly advantageous version, each of the transceivers conforms to at least one of single-band IEEE 802-11 and IEEE 802.11a/g WLAN standards, which latter may be at 2.4 to 2.5 GHz and 4.9 to 5.87 GHz.

When the transmit-receive means is a switch, the switch includes a common port and first and second individual ports, and the digital control and processing means selects between transmit or receive modes of operation, for setting the switches of the system to connect the common port to the first individual port in the transmit mode of operation, and for setting the switch means to connect the common port to the second individual port in the receive mode of operation.

Another system comprises a network for distribution of clock signals to all elements in the array, so as to enable spatial and temporal coherence of the elements, thereby providing the ability to steer beams and, by steering beams away from undesirable signal sources, to suppress undesirable signals.

A radar apparatus as described by Ehret et al. combines COTS MMIC combination ADC/DACs, COTS MMIC transceivers, COTS power amplifier chips, and supporting power, control, and data I/O on a plurality of like integrated assembly boards. In one version, the apparatus is made up of a plurality of COTS MMIC chips, each of which includes a combination ADC/DAC and transceiver.

FIG. 1 is a simplified block diagram of a radar system 10 according to Ehret et al. In FIG. 1, a set 12 of antenna elements includes plurality of elemental antennas 12$a$ . . . 12$c$, 12$d$ . . . 12$f$, 12$g$ . . . 12$h$ arranged in an antenna array. Each of antenna elements 12$a$ . . . 12$c$, 12$d$ . . . 12$f$, 12$g$ . . . 12$h$ is connected by an analog signal path to an associated one of a set 14 of up/downconverter-transceiver ADC/DACs (U/DC-Tx ADC/DACs) 14$a$, . . . 14$c$, 14$d$ . . . 14$f$, 14$g$ . . . , 14$h$. Each (U/DC-Tx ADC/DAC) of set 14 is in analog communication with the associated elemental antenna of set 12 of antennas, and in digital communication with an associated digital processor. As illustrated in FIG. 1, U/DC-Tx ADC/DACs 14$a$, . . . 14$c$ communicate with a processor $16_1$ of a set 16 of digital processors, U/DC-Tx ADC/DACs 14$d$, . . . , 14$f$ communicate digitally with a processor $16_2$, and U/DC-Tx ADC/DACs 14$g$, . . . , 14$h$ communicate digitally with a processor $16_N$. Each of the processors of set 16 communicates digitally with a command processor 18.

Command processor 18 of FIG. 1 determines or establishes the various parameters or characteristics of the radar signal to be transmitted, such as the timing, carrier frequency, pulse width, pulse length, pulse coding, sidelobe level, steering angle, number of beams, and the like. The digital command signals are transmitted from processor 18 to the various processors of set 16, namely processors $16_1$, $16_2$, . . . , $16_N$. Each processor of set 16 of processors receives the command signals and in response generates digital signals which represent the analog signal to be transmitted from each elemental antenna of set 12 of antennas. That is, the digital signals produced by processors of set 14 of processors are digital equivalents of the baseband analog signals to be transmitted from the various elemental antennas of set 12 with which the processors are associated. Thus, processor $16_1$ produces a plurality of individual digital signals, the bits of which represent at least the amplitude and relative phase of the analog signal to be transmitted from the corresponding elemental antennas. The transmit frequency is selected by the control processor, and a control signal is sent to each of the U/DC-Tx units, to command U/D conversion using that RF center frequency. If appropriate, the bits of the digital signal may also directly contain the frequency of the analog signal to be transmitted. It will be clear that the number of digital processors in set 16 of processors depends upon various factors which determine the computational load on the processors and the capabilities of the processors. In principle, all the processors of set 16 and processor 18 can be subsumed into a single processor, which is designated generally as 15. For many applications, more than one processor may be required. Thus, processor 15 as illustrated in FIG. 1 includes portions 15T for controlling transmit functions, and portions 15R for controlling receive functions and processing receive signals, as illustrated in FIG. 2.

In the arrangement of FIG. 1, the digital signals produced by the various processors of set 16 of processors are applied to up/downconverter-transceiver ADC/DACs (U/DC-Tx ADC/DACs) 14$a$, . . . , 14$c$, 14$d$ . . . , 14$f$, 14$g$ . . . , 14$h$. That is, each digital signal representing one analog signal to be transmitted by the radar set 10 is applied to one U/DC-Tx ADC/DAC of set 14. For example, a digital signal representing the analog signal to be transmitted by elemental antenna 12$a$ is applied from, processor $16_1$ to U/DC-Tx ADC/DAC 14$a$. U/DC-Tx ADC/DAC 14$a$ converts the digital signal to analog, and upconverts the resulting analog signal to the desired operating frequency by means of a transceiver (not illustrated in FIG. 1). The upconverted analog signal is applied to antenna element 12$a$. Similarly, U/DC-Tx ADC/DAC 14$c$ converts to analog form the digital signal from processor $16_1$, and upconverts the resulting analog signal to the desired operating frequency by means of a transceiver. The upconverted analog signal is applied from U/DC-Tx ADC/DAC 14$c$ to elemental antenna 12$c$. Likewise, a digital signal representing the analog signal to be transmitted by elemental antenna 12$d$ is applied from processor $16_2$ to U/DC-Tx ADC/DAC 14$d$. U/DC-Tx ADC/DAC 14$d$ converts the digital signal to analog, and upconverts the resulting analog signal to the desired operating frequency by means of a transceiver. The upconverted analog signal produced by U/DC-Tx ADC/DAC 14$d$ is applied to elemental antenna 12$d$. Similarly, U/DC-Tx ADC/DAC 14$f$ converts the digital signal from processor $16_2$ to analog, and upconverts the resulting analog signal to the desired operating frequency by means of a transceiver. The upconverted analog signal is applied from U/DC-Tx ADC/DAC 14$f$ to elemental antenna 12$f$. For completeness, a digital signal representing the analog signal to be transmitted by elemental antenna 12$g$ is applied from processor $16_3$ to U/DC-Tx ADC/DAC 14$g$. U/DC-Tx ADC/DAC 14$g$ converts the digital signal to analog, and upconverts the resulting analog signal to the desired operating frequency by means of a transceiver. The upconverted analog signal produced by U/DC-Tx ADC/DAC 14$g$ is applied to elemental antenna 12$g$. Similarly, U/DC-Tx ADC/DAC 14$h$ converts the digital signal from processor $16_3$ to analog, and upconverts the resulting analog signal to the desired operating frequency by means of a transceiver. The upconverted analog signal is applied from U/DC-Tx ADC/DAC 14$h$ to elemental antenna 12$h$.

Thus, in a transmit mode of operation, the radar system 10 of FIG. 1 transmits from each elemental antenna of an antenna array 12 analog signals controllable in amplitude, frequency, relative phase, and modulation characteristics under control of generalized processor 15. By selecting the characteristics of the underlying digital signals to represent plural beams, multiple instantaneous transmit beams can be generated.

In a receive mode of operation of the arrangement of FIG. 1, return or reflected signals from one or more targets (not illustrated) are received at each elemental antenna of set 12 of antennas. The received signals are downconverted in the associated U/DC-Tx ADC/DAC of set 14 of U/DC-Tx ADC/DACs, to thereby generate baseband or possibly intermediate-frequency (IF) signals. The baseband or IF signals are converted into digital form, conserving the amplitude and phase information. The digital data generated by each U/DC-Tx ADC/DAC, representing the analog signal received at the corresponding elemental antenna of set 12 of antennas, is or are applied to the associated processor of set 16 of processors.

The individual processors of set 16 of processors process the data to define the various receive beams selected by command processor 18, and to extract the return information from a subarray of antenna elements. Thus, the information extracted by U/DC-Tx ADC/DACs 14a, . . . , 14c from the return signals received by antenna subarray 12a, . . . 12c is processed by processor $16_1$ to produce a portion of the target information. The extracted subarray data from processor $16_1$ is combined with subarray data from other subarrays in control processor 18, which produces data for display or further processing. Thus, the receive signal processing is performed by generalized processor 15. Multiple simultaneous receive beams are advantageous, as noted in a paper by Merril Skolnik of the Naval Research Laboratory, Washington, D.C. and entitled *ATTRIBUTES OF THE UBIQUITOUS PHASED ARRAY RADAR*, published 2003 by the IEEE.

FIG. 2 is a simplified block diagram of another system according to Ehret et al. In the arrangement of FIG. 2, elements corresponding to those of FIG. 1 are designated by like reference numerals. In FIG. 2, a set 12 of arrayed antenna elements includes antenna elements 12a through 12c, each of which is connected to a transceiver/ADC/DAC (TAD) arrangement of a set 214 of transceiver/ADC/DAC arrangements 214a through 214c. Set 12 of antenna elements also includes antenna elements 214d through 214f, which are connected to transceiver/ADC/DAC arrangements 214d through 214f, and antenna elements 12g through 12h, which are connected to transceiver/ADC/DAC arrangements 214g through 214h. Transceiver/ADC/DAC arrangements 214a through 214c, in turn, are connected to a processor $220_1$, which in one embodiment is a programmable gate array used to interface with and route data to and from the individual TADs 214a through 214c. Similarly, transceiver/ADC/DAC arrangements 214d through 214f, in turn, are connected to a processor $220_2$, which is likewise a programmable gate array in one embodiment. For completeness of description, transceiver/ADC/DAC arrangements 214g through 214h, in turn, are connected to a processor $220_3$. The remainder of the arrangement of FIG. 2 is equivalent to that of FIG. 1, except that some of the interconnecting digital data paths identified by alphanumerics. In one version of this embodiment, the number of elemental antennas 12a through 12c is eight, and the number of TADS 214a through 214c in subassembly or "blade" $213_1$ (so called because the physical substrate is blade-shaped) is eight. Similarly, the number of elemental antennas 12d through 12f is eight, and the number of TADs in blade $213_2$ is eight. For completeness, the number of antenna elements 12g through 12h is eight, and the number of TADs in blade $213_N$ is eight. In FIG. 2, the blades of set 213 are connected to processors of set 216 of processors (of generalized processor 15) by a set of data paths 222, and the processors of set 216 of processors are connected to command processor 18 by a set of data paths 224. More particularly, blades $213_1$, $213_2$, . . . , $213_N$ are connected to processor $216_2$ by serial data paths $222_1$, $222_2$, . . . , $222_N$, respectively. Processors $216_1$, $216_2$, . . . , $216_N$ are connected to command processor 18 by way of serial data paths $224_1$, $224_2$, . . . , $224_N$ of a set 224 of data paths. In the arrangement of FIG. 2, the generalized processor 15 can be viewed as including processor set 220.

As mentioned, the processors $220_1$, $220_2$, . . . , $220_N$ of set 220 of processors of FIG. 2 interface between their associated transceiver/ADC/DAC arrangements (TADS) of set 214 and buses or network digital paths $222_1$, $222_2$, . . . , $222_N$ of set 222 of serial buses. In both transmit and receive modes of operation of the arrangement of FIG. 2, command processor 18 of generalized processor 15 transmits through the distribution network clock data, transmit/receive mode data, and other housekeeping information. In transmit operation of the arrangement of FIG. 2, each processor $216_1$, $216_2$, . . . , $216_N$ of set 216 of processors receives from command processor 18 commands representing the characteristics of the signal to be transmitted and produces or digitally synthesizes eight baseband waveforms which exhibit the characteristics of pulse width, pulse length, and phase and amplitude relative to that of adjacent elements. The synthesized signals in digital form are transmitted over the bus $222_1$ to field programmable gate array (FPGA) $220_1$, over bus $222_2$ to FPGA $220_2$, and over bus $222_N$ to FPGA $220_N$. FPGAs $220_1$, $220_2$, . . . , $220_N$ parse the digital data, convert from serial to parallel form, and route the data to the appropriate one of TADs of set 214 of TADs. Each TAD then converts the digital data that it receives to analog signal form, and the analog signal is applied to the associated antenna element of set 12 of antenna elements. In one embodiment of Ehret et al., the FPGAs have sufficient processing power to store some of the transmit waveforms in local memory, so that some of the waveforms to be transmitted can be generated locally without involving the higher-level processors of sets 216 or 18.

The individual transceiver/ADC/DACs (TADs) of set 214 of FIG. 1 produce analog signal baseband (or possibly IF) frequency to be transmitted from the transmit digital data, and upconvert the analog baseband signal to the frequency established by the control bits from the processors. The upconverted signals are transmitted to from each TAD to an associated antenna or transducer for transmission. The transmitted signals propagate from the antenna elements of set 12 and may impinge upon a target, thereby producing return or reflected signals, as known to those skilled in the art. The reflected signals, if any, return to the radar system 10, where the antenna elements 12a, . . . , 12h receive the returned or reflected signals, and couple them to the associated TADs of set 214. Each TAD of set 214 of TADs in the reception mode generates a local oscillator signal based on the clock data distributed from command processor 18. Each TAD of set 214 of TADs downconverts to baseband (or possibly IF) the signal received by its associated antenna element. The baseband signals are converted to parallel digital form within the TADs. The digital data representing the return signals is or are applied to the gate arrays of set 220. The gate arrays of set 220 route the data over the serial buses of set 222 to the processors of set 216 of processors. The processors, when receiving return-signal representative data, applies complex weighting function to the data from each element and coherently sums the data from each element in a particular direction or directions so as to generate directive receive beams. This process is repeated many times per data set, so that in principle an infinite number of beams with unique characteristics can be formed from a single data set from the TADs. The data is also converted into an output form that is made available on a path 240, to identify the presence or absence of a target and possibly other characteristics of the target(s).

FIG. 3 is a simplified diagram in block and schematic form illustrating a representative single TAD of FIG. 2, and its interconnections with the associated antenna element. For definiteness, antenna element 12a and TAD 214a are selected as representative. In FIG. 3, TAD 214a includes an analog bandpass filter 310 having a port coupled to antenna element 12a. A second port of filter 310 is connected or coupled to a "common" port 312c of a single-pole, double-throw transmit/receive switch 312. Switch 312 is illustrated by a mechanical switch symbol, as is common for explanatory material. Those skilled in the art realize that solid-state switches are actually used in practice. In the mechanical switch symbol 312, the common port is connected to a movable element illustrated as an arrow, which can connect to one of two individual ports. As illustrated, the movable element of switch 312 is in a position in which the antenna element 12a and filter 310 are coupled through common port 312c to a receive port 312r. In the other position of switch 312, the common port 312c is coupled to a transmit switch port 312T. The transmit or receive state of switch 312 is controlled digitally with commands originating from command processor 18 of FIG. 1 or 2.

In the arrangement of FIG. 3, digital data representing the analog signals to be transmitted are applied by way of Digits In path 314 to a clocked combination analog-to-digital and digital-to-analog converter (AD/DA) 320. In the particular embodiment illustrated in FIG. 3, AD/DA 320 is a Maxim MAX5864 monolithic mixed-signal integrated circuit (MMIC), which is a commercial off-the-shelf device (COTS). A mixed-signal device operates on both digital and analog signals. The serial digital data to be transmitted is applied to AD/DA 320, and multiplexed within AD/DA 320 to produce mutually quadrature-phase data. Two digital-to-analog converters (DACs) separately convert the digital data into analog form. The inphase (I) (or real) and quadrature (Q) (or imaginary) components of the resulting analog signal are generated at analog signal ports ID+ and QD+, and carried on signal paths 322R and 322Q, respectively, for application to a solid-state transceiver 340. In the particular embodiment of FIG. 3, the transceiver 340 is a Maxim type MAX2828 integrated circuit, also a MMIC COTS device. Both the AD/DA 312 and transceiver 340 are commercial off-the-shelf (COTS) items which are designed for Wi-Fi wireless local area network data communications. Wi-Fi is a name coined by the Wireless Ethernet Compatibility Alliance for equipment interoperable with IEEE standard 802.11.

Transceiver 340 of FIG. 3 has a pair of transmit analog signal input ports 340ti1 and 340ti2, which couple the transmit analog signals (by way of antialias filters) to a pair of mixers or multipliers (X) 341 and 342. Clock data to establish a frequency reference is or, are applied to a phase-lock loop designated generally as 343. Multipliers 341 and 342 also receive reference-frequency signals from phase-lock loop 343 by way of a phase shifter 344 to provide the mixers 341 and 342 with mutually quadrature reference signals. The application of the reference signals at or near the desired upconverted frequency causes the mixers to operate as upconverters, producing carrier signal modulated by the commanded functions. The upconverted signals produced by mixers 341 and 342 are applied to an amplifier 345, which amplifies the upconverted carrier signal. The amplified upconverted carrier signal appears at a transmit signal output port set 346 of transceiver 340. The amplified upconverted carrier signal appearing at output port set 346 of transceiver 340 can be amplified, if desired, before application to the transmit individual port 3127 of transmit/receive switch 312. In the particular embodiment of FIG. 3, a COTS 1-watt amplifier is coupled to the Wi-Fi transceiver 340 to provide greater transmit power than that provided by the transmit signal amplifier 345 of the transceiver integrated circuit 340. Such an amplifier preferably uses gallium arsenide (GaAs) transistors at the present state of the art.

In operation of the arrangement of a radar system using elements corresponding to that of FIG. 3, the command processor 18 of FIG. 1 or 2 selects the transmission mode, and sets the switches 312 to the transmit mode. Command processor 18 also selects a time for transmission of radar signals, and the various parameters of the signal to be transmitted. The command processor 18 sends digital data representing this information to the lower-level processors, which respond to the commands by generating digital representations of the analog signals to be transmitted, including, if appropriate, a plurality of transmit beams to be formed by the antenna array. The digital data is applied to the digital-to-analog converters (DACs) of AD/DA integrated circuit 320, which generates the corresponding analog signal. The analog signal to be transmitted is sent to the upconverters 341, 342 of transceiver integrated circuit 340, and amplified by amplifier 345. The signal from amplifier 345 is further amplified by power amplifier 360. The amplified signals from amplifier 360 are applied through switch 312 in its transmit mode of operation, through bandpass filter 310 to the antenna element. Bandpass filter 310 is selected to suppress unwanted frequency sidebands and components which are artifacts of the upconversion process.

The radar system incorporates many structures such as that of FIG. 3. The command processor 18 of FIGS. 1 and 2 establishes the characteristics of the signals which are transmitted from each of the elemental antennas of set or array 12 of antennas, in such a manner as to define the transmit beam or beams and their steering direction, beam width, sidelobe levels; inserted nulls, and the like. The signals transmitted by the various elemental antennas of set 12 of antennas "combine in space" to produce the desired radiation pattern.

In the presence of one or more targets within the transmitted beam of electromagnetic energy, reflections can be expected to occur. When reflections occur, they propagate in various directions, and some of the reflected energy returns to the radar system. By the time reflected energy has returned to the radar system, the command processor 18 of FIGS. 1 and 2 will have commanded all of the transmit/receive switches 312 to assume the receive state, in which the common port 312c is coupled to the receive individual port 312R. Returned electromagnetic signal is picked up or received by each of the various antenna elements of set 12, including representative antenna element 12a of FIG. 3. The energy received by antenna element 12a is coupled through bandpass filter 310 to the common port of switch 312, and thence to receive individual port 312R. From switch 312, the received signal energy is coupled to a receive signal port 348 of transceiver 340.

The received signal energy coupled to receive signal port 348 of FIG. 3 is applied to the input port of a low-noise amplifier 350 to produce amplified return or reflected signal. The amplified return signal is applied to a downconverter including multipliers (X) 351 and 352. Multipliers 351 and 352 also receive the same reference carriers that are applied to upconverter multipliers 341 and 342, in the same quadrature relationship. Multipliers 351 and 352 downconvert the received signal to produce inphase (I) and quadrature (Q) baseband return signals. The downconverted signal may deviate from exact baseband (or IF frequency) as a result of Doppler shifts imposed on the return signal. The I and Q baseband return signals are filtered 353, 354 to reduce intermodulation products, and amplified 355, 356 to produce baseband analog return I and Q signals at transceiver return signal output ports 340Ro1 and 340Ro2.

The baseband analog return I and Q signals at transceiver return signal output ports 340Ro1 and 340Ro2 are coupled to analog I and Q signal input ports IA+ and QA+, respectively, of AD/DA 320. The return analog I and Q signals are individually applied to ADCs of AD/DA 320, to thereby produce digital signals representing the return analog I and Q signals. The digital data produced by the ADCs of AD/DA 320 are applied to a multiplexer for putting the data in serial form for transmission to the next stage of processing.

It is desirable to coherently sum the signals transmitted from the various elemental antennas in the transmission mode of operation, and to coherently sum the received signals, in a manner that defines the desired antenna beams on transmission and reception, respectively. To enable the coherent summation of signals from all of the array elements, the digital data transmitted from, or received by, each antenna element must be "generated" or processed in a manner that maintains phase alignment of the signals from each element. This is achieved by distributing a reference clock to the transceiver of each element, and more particularly to the phase-lock loop 343. In one embodiment of a radar according to Ehret et al., the reference clock is at 160 MHz. This distribution is accomplished, in part, by generating the desired clock signal, or at least digital signals representing the desired clock signal, within command processor 18 of FIG. 2, as for example by means of a master clock (CLK) generator 18c. A distribution network including the data paths of set 224, processors of set 216 of processors, and the data paths of set 222, distributes to each blade of set 213 of blades, and within each blade, provides this clock signal to each transceiver of set 14 of transceivers. The distribution network enables a single reference clock signal to be power divided (or replicated) and distributed to each transceiver with only a small delta phase component from element to element. The transceivers use this signal in a phase lock loop circuit to generate intermediate frequencies which are mixed with RF and baseband frequencies to generate baseband and RF frequencies, respectively.

FIG. 3 and the description herein are simplified to make the main operation clear. Those skilled in the art will understand that the AD/DA 320 and the transceiver 340 require power supplies, reference supplies, and various control functions, and other support, and know what to provide and how to provide it.

FIG. 4 is a simplified block diagram of a portion of a radar system according to another embodiment of Ehret et al. In the portion of FIG. 4, elements corresponding to those of FIG. 2 are designated by the same alphanumeric. FIG. 4 differs from the arrangement of FIG. 2 in that the transmit/receive switch 312 is replaced by a circulator 412. In the arrangement of FIG. 4, circulator 412 includes a first port $412_1$, which connects to the output of power amplifier 360 (or directly to output port 346 of transceiver chip 340, if desired). Signals to be transmitted are coupled from amplifier 360 to port $412_1$, and are circulated in the direction of the indicating arrow to port $412_2$. The signals to be transmitted exit port $412_2$ and flow to the filter 310 and antenna element 12c. Signals received by antenna element 12c are coupled through filter 310 to circulator port $412_2$, and are circulated to port $412_3$. The received signals exit port $412_3$ and are coupled to receive signal input port 348 of transceiver chip 340. Circulators are well known in the art and require no further description. Use of circulators rather than switches reduces the need to generate and distribute transmit/receive switch control signals.

FIG. 5 is a simplified diagram in block and schematic form taken from an application note for type COTS MMIC AA1001 wideband RFIC transceiver 540 pursuant to WiMax (IEEE 802.16) standards, and thus is compatible with the 802.11 standard. This solid-state or MMIC transceiver differs from that of FIG. 3 in that it incorporates the digital-to-analog (RXADC) and analog-t0-digital (TXDAC) converters within the same device. This eliminates the need for a separate chip. The AA1001 also differs in that it is capable selectively operating at multiple frequency bands. The AA1001 is usable in the same manner as the combination of the Maxim MAX2828 transceiver with the Maxim MAX5864 AD/DA. The salient difference between these two embodiments, of course, is that only one MMIC chip, namely the combined transceiver/AD/DA 540, is needed to perform all the digital-to-analog processing, transceiving, and analog-to-digital processing. Those skilled in the art will recognize that the AA1001 should receive the reference signal at the DCXO port illustrated as connected to a crystal symbol, and that other modifications may be required. Thus, the arrangement of FIG. 2 may be viewed as including the combined functions of transceiving and AD/DA conversion on a single chip.

Other embodiments of the Ehret et al. arrangement will be apparent to those skilled in the art. For example, while the buses have been described as being serial, they may be parallel, or a mixture of serial and parallel. Where the term "port" or the like is used, it will be understood that multiple connections may be contemplated, as in the case of I and Q components of a signal.

SUMMARY OF THE INVENTION

A method according to an aspect of the invention is for synchronizing mutually separated first and second clocks. The method comprises the steps of transmitting a first clock signal by way of an analog transmission line from the first clock to the second clock, whereby at least a portion of the first clock signal is reflected from the second clock and propagates toward the first clock as a reflected first clock signal. At a location near the first clock, the first clock signal and the reflected first clock signal in the transmission line are sampled to thereby produce sampled first clock signal and sampled reflected first clock signal. The propagation time of the transmission line is determined from the relative timing of the sampled first clock signal and the sampled reflected first clock signal. The second clock is set to be synchronous with the first clock signal as it appears at the location of the second clock, minus the propagation time. In another mode of the method according to the invention, an apparatus is synchronized by the first and second clocks, and the operation of the apparatus is compensated for the propagation time of the transmission line. In one version, the step of sampling includes the step of providing a transmission line directional coupler or directional bridge at the location near the first clock. The directional coupler or bridge may be a bidirectional directional coupler or bridge.

A method according to another aspect of the invention is for synchronizing TR modules in a radar using a phased-array antenna in which each one of a plurality of local oscillators controls the TR modules of a set of TR modules. The method comprises the steps of coupling a master oscillator by way of a plurality of transmission lines to a like plurality of the local oscillators. A bidirectional directional coupler or bridge is provided at locations along each of the plurality of transmission lines, which locations are close to the master oscillator. By way of the bidirectional directional couplers or bridges, master oscillator signals transmitted from the master oscillator to the local oscillators (of set 716 of local oscillators) are sampled, to thereby produce a forward master clock sample for each local oscillator. By way of the bidirectional couplers or bridges, reflected master oscillator signals which are reflected from the corresponding local oscillator are sampled, to thereby produce sampled reflected master oscillator signals for each of the local oscillators. The phase of the forward master clock sample is compared with the phase of the reflected master clock signal for each of the local oscillators, to thereby generate phase information representative of at least changes in the propagation time delay between the master oscillator and each local oscillator. The time delay information is provided to a radar processor which controls the TR modules, and corrects the commands of the processor to each of the TR modules to compensate for the effects of the time delay.

DESCRIPTION OF THE INVENTION

Figure 2:
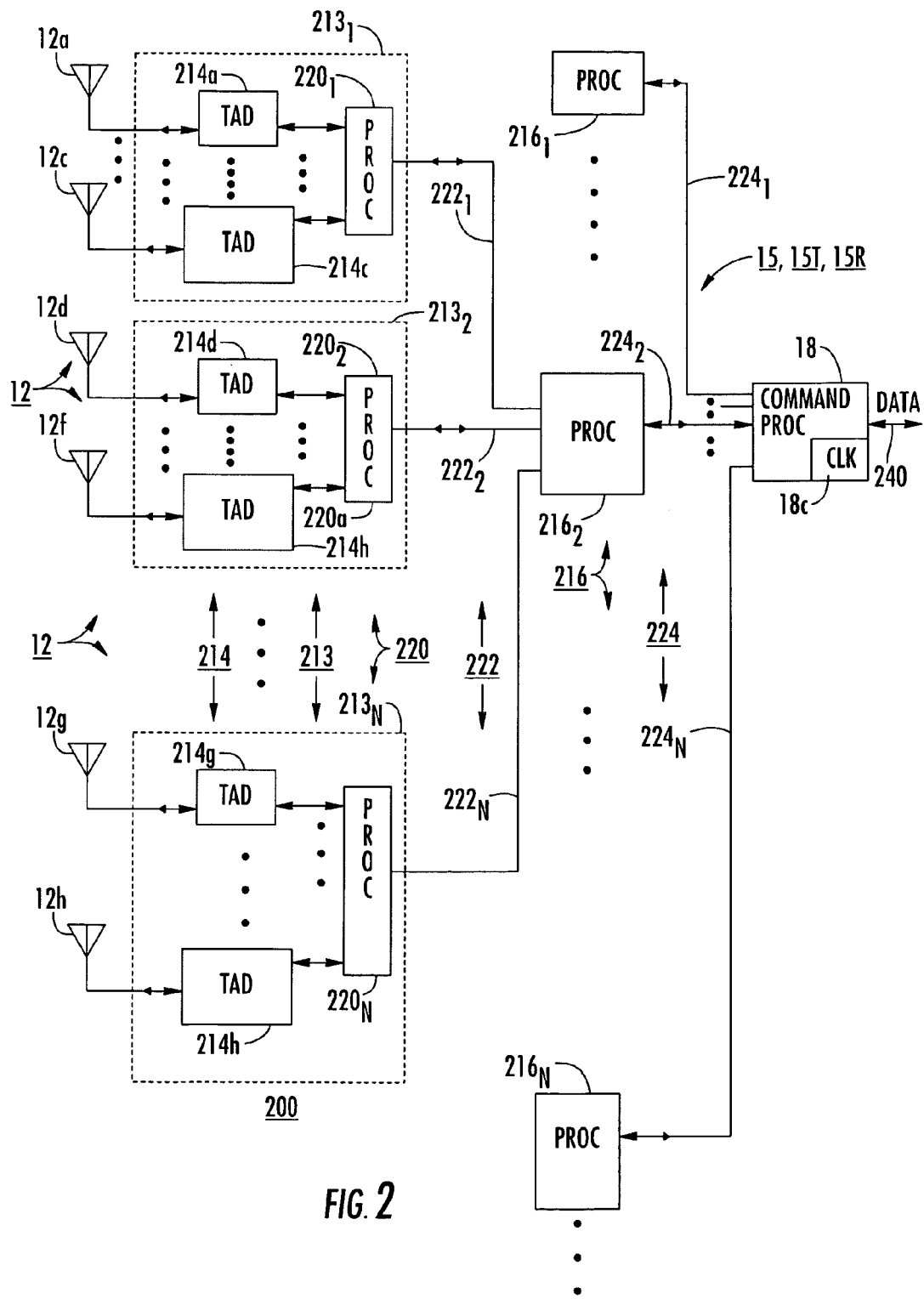
FIG. 2 is a simplified block diagram illustrating a radar system according to Ehret et al.
Figure 3:
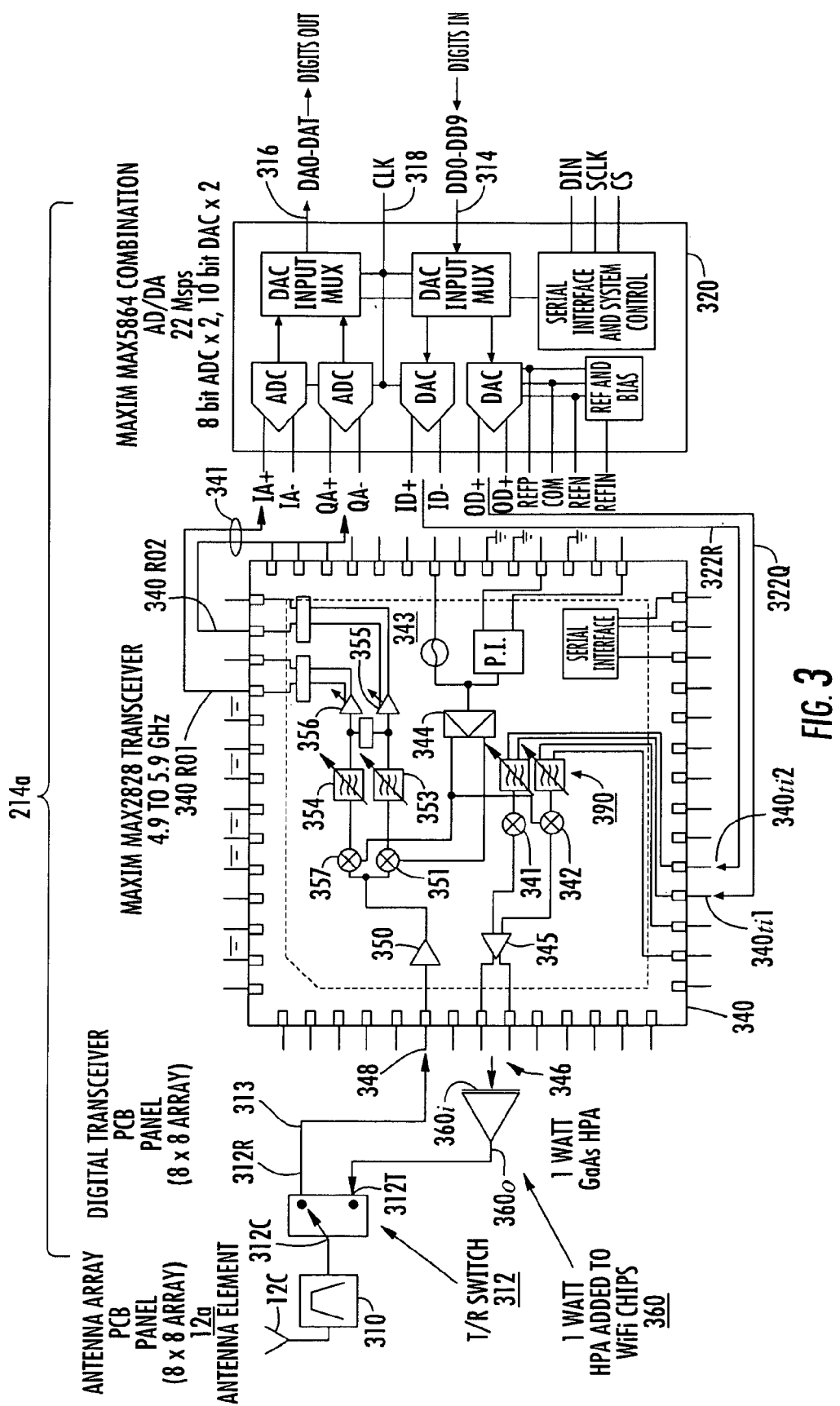
FIG. 3 is a simplified diagram in block and schematic form illustrating a portion of the radar system of FIG. 2.
Figure 4:
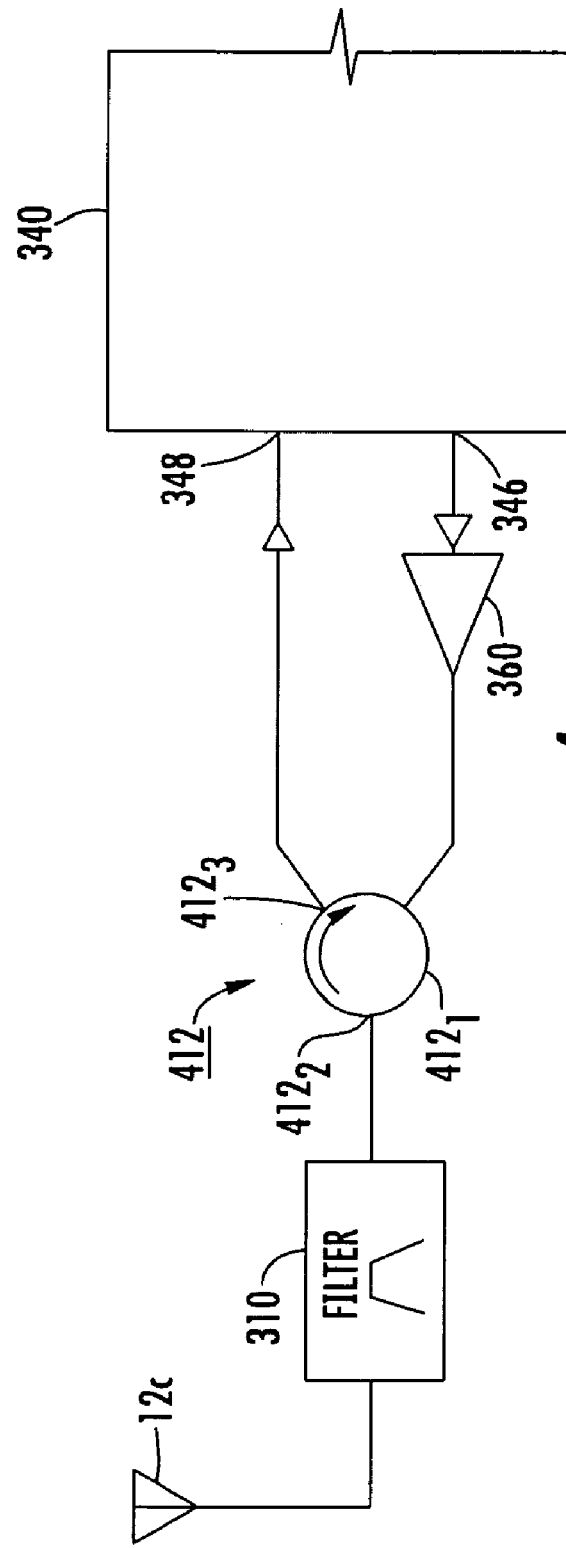
FIG. 4 is a simplified diagram in block and schematic form illustrating the use of a circulator rather than a switch in the radar system of FIG. 2.
Figure 5:
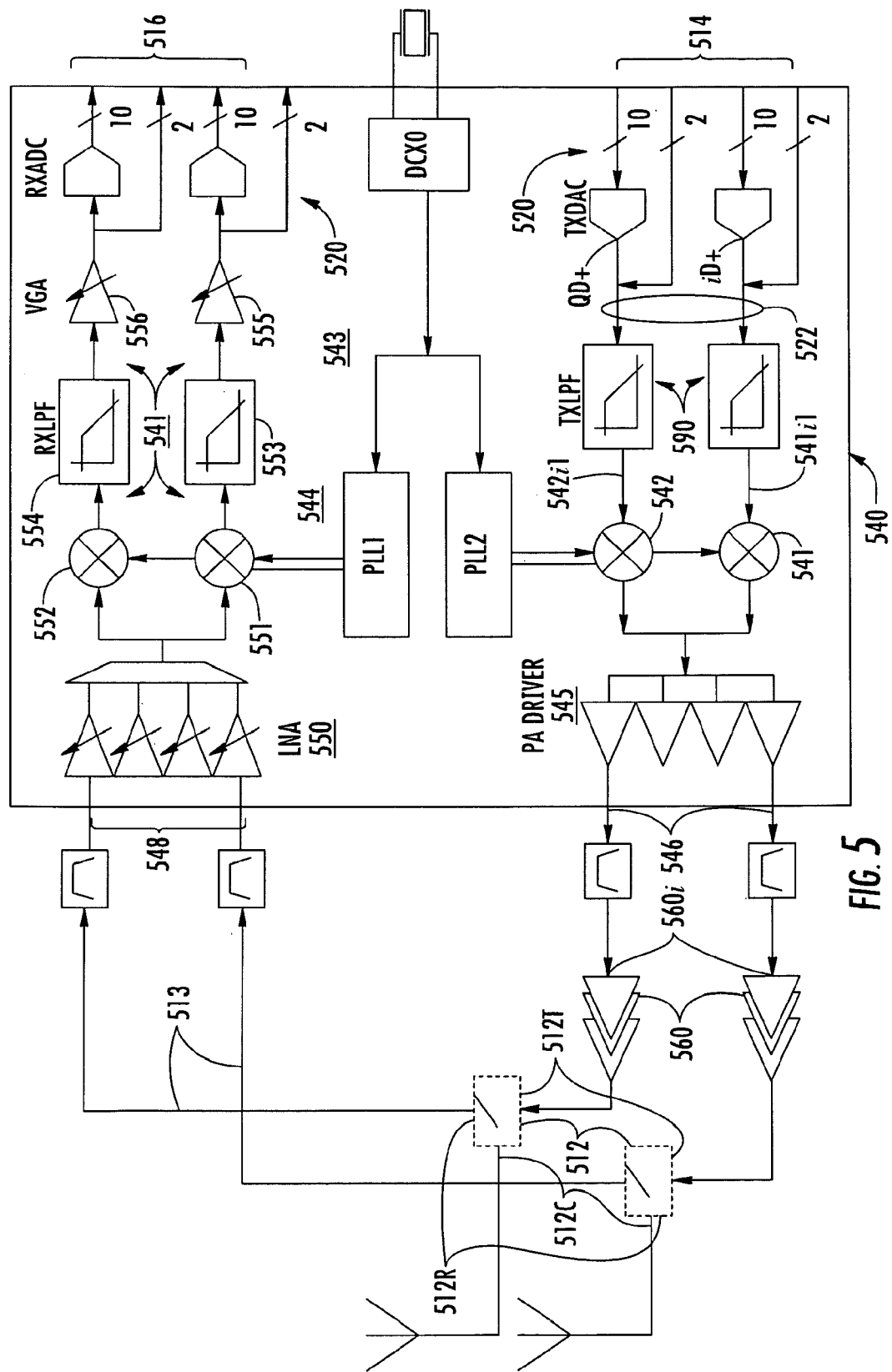
FIG. 5 is a simplified diagram in block and schematic form illustrating another type of monolithic microwave integrated circuit which can be used in the radar of FIG. 2.
Figure 6:
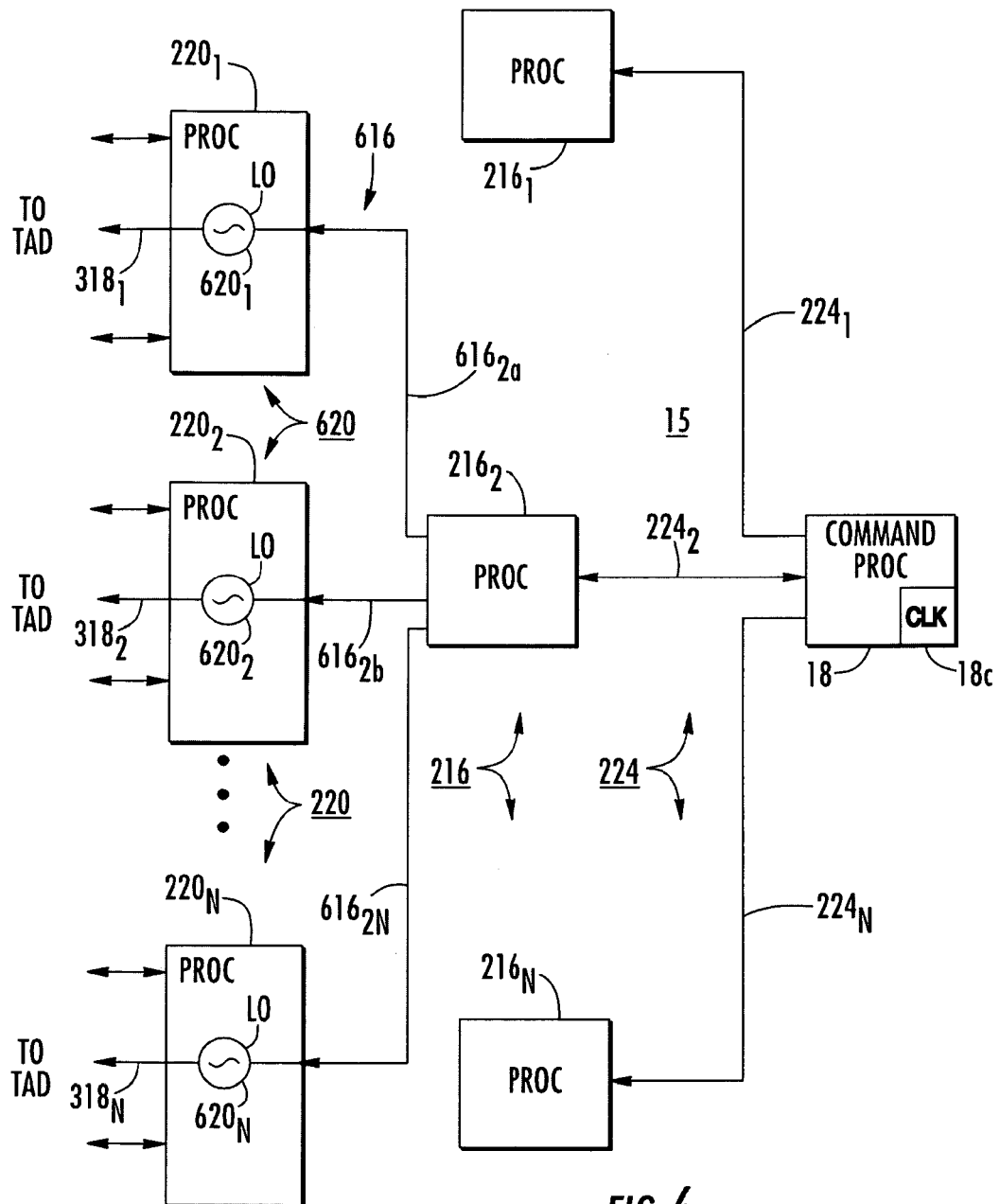
FIG. 6 is a simplified representation of the connection of a master oscillator to a plurality of local oscillators, where at least some of the connections are made by way of "analog" transmission lines.

In the arrangement of FIG. 2, as mentioned, the processors $220_1, 220_2, \ldots 220_N$ of set 220 of processors of FIG. 2 interface between their associated transceiver/ADC/DAC arrangements (TADs) of set 214 and buses or network digital paths $222_1, 222_2, \ldots, 222_N$ of set 222 of serial buses. In both transmit and receive modes of operation of the arrangement of FIG. 2, command processor 18 of generalized processor 15 transmits clock data, together with other information, through the processing and distribution network 15 (including transmit portions 15T and receive portions 15R). As illustrated in FIG. 6, each processor $220_1, 220_2, \ldots, 220_N$ of set 220 of processors can may include a local oscillator (LO) which generates the clock signals for its associated transceiver/ADC/DAC (TADs) of set 214 of TADs. More particularly, in the arrangement of FIG. 6, processors $220_1, 220_2, \ldots, 220_N$ of set 220 of processors each include a local oscillator (LO), namely $620_1, 620_2, \ldots, 620_N$, respectively, of a set 620 of local oscillators. These local oscillators are controlled or slaved in known fashion to the master oscillator 18c of command processor 18 by way of paths and generalized processing 15. The local oscillator signals generated by each processor of set 220 of processors produces its local clock signal for each of its local transceiver/ADC/DAC (TADs) of set 214 of TADs on a signal path illustrated in FIG. 3 as CLK path 318. More specifically, the LO signals from oscillator 6201 are applied by way of a path $318_1$, those from oscillator $620_2$ are applied by way of a path $318_2, \ldots$, and those from oscillator $620_N$ are applied by way of a path $318_N$.

Figure 1:
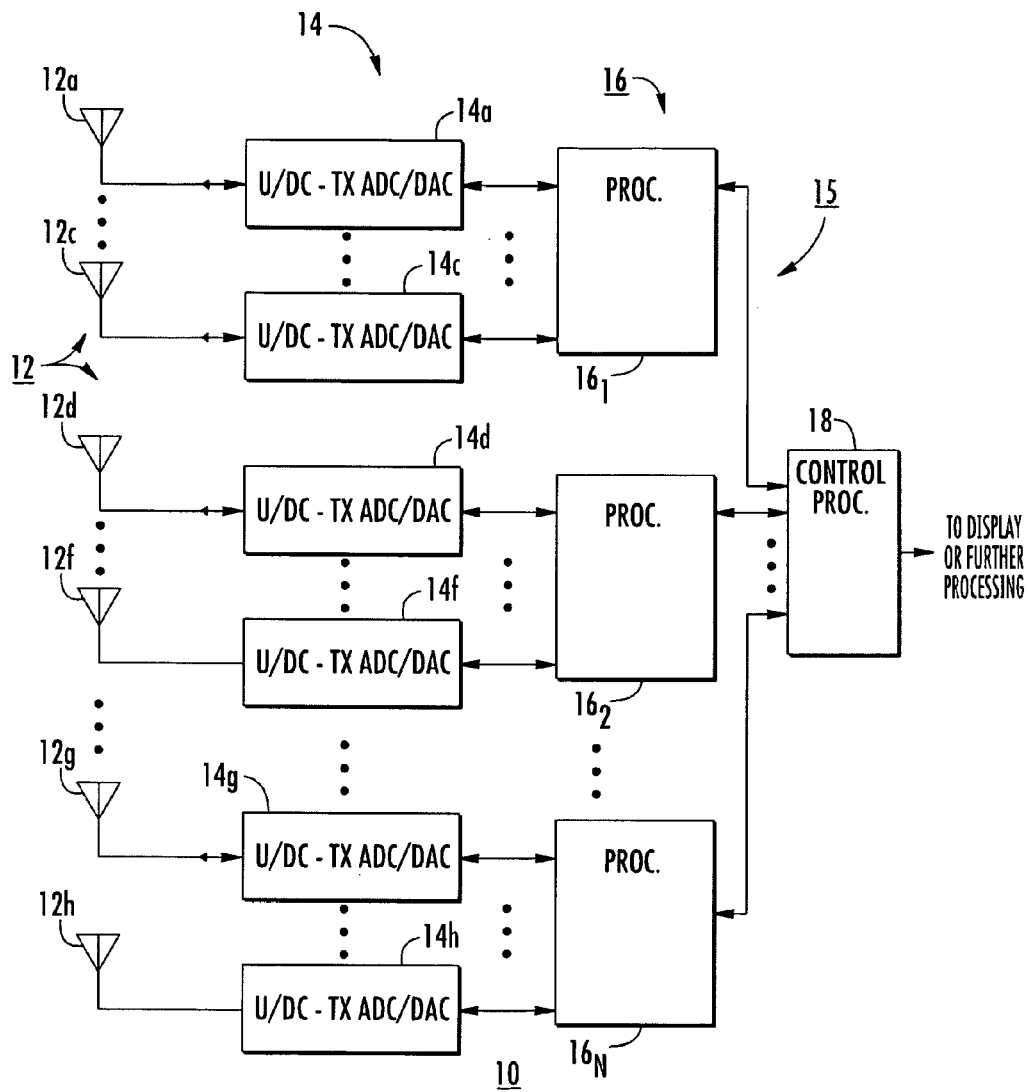
FIG. 1 is a simplified block diagram illustrating a radar system according to the Ehret et al. prior art.

Those skilled in the art know that the local oscillators of set 620 of FIG. 6 must be synchronization with the master oscillator 18c so that proper phase control of the antenna beams produced by array 12 can be established. For this purpose, the lengths of the various signal or transmission paths extending between master oscillator 18c and the local oscillators must be equal in electrical length, or at least any difference in length must be compensated for by the processing of the control or command processor 18 of FIG. 1. If there is an uncompensated difference between the electrical lengths of the signal or transmission paths, the phase of the master oscillator reference arriving at the local oscillators will differ one to the other. Such phase differences or errors will, if not compensated, translate into at least incorrect beam directions and may undesirably result in incoherent transmission pulses and inability to properly integrate the reflected radar returns. In FIG. 6, the "analog" transmission lines carrying clock signals include at least paths $616_{2a}, 616_{2b}, \ldots 616_{2N}$ of set 616 of transmission lines. During setup of the system of FIG. 2, the analog transmission line lengths are measured and the measured delays are stored in the command processor 18. The command processor then uses this information to compensate the operation of the radar system for any differences in path length. It must be understood that all transmission lines can carry analog signals and can also carry at least some forms of digital signals, as for example serial digital signals may be viewed for transmission-line purposes as having analog qualities such as rise time, fall time and bandwidth. Thus, there is no underlying difference among transmission lines carrying analog clock signals, and an "analog" transmission line for purposes of this invention includes twisted pairs and bundles thereof, coax, microstrip, stripline, and excludes "parallel" paths. Those skilled in the art understand such matters.

It is well known that the phases of the reference or master oscillator to which the local oscillators are locked or synchronized can be adjusted to be equal by appropriate selection of the lengths of the signal paths or transmission lines lying between the master oscillator 18c and the various local oscillators $620_1, 620_2, \ldots 620_N$. As an alternative, any differences in path lengths can be compensated for by the signal processing. Unfortunately, the signal paths or transmission lines may change their delay or phase characteristics as a function of motion or vibration, as a function of temperature, and as a function of time or aging. Thus, a system which was properly phased initially may not be properly phased after shipment to its use location or destination, or in the presence of temperature extremes. Also, use on board a vehicle is often associated with vibration, and the vibration may adversely affect the original phase settings. Even in the absence of adverse environmental conditions, simple aging may affect the dielectric material of the transmission lines and result in phase error.

According to an aspect of the invention, the electrical lengths of the various transmission lines are initially set to known or effective values, and thereafter phase or electrical lengths of the various transmission paths are continuously monitored, and the electrical lengths of the master-to-local-oscillator transmission paths are either automatically corrected toward known values, or more generally the electrical lengths or phase characteristics are reported to the control processor (18 of FIG. 1), which adjusts the digital commands of the radar system to take into account the measured value of the various paths. This allows the synchronization of the various local oscillators to "drift" relative to the master oscillator standard, with corrective digital commands to the radar system to accommodate the drift.

Figure 7:
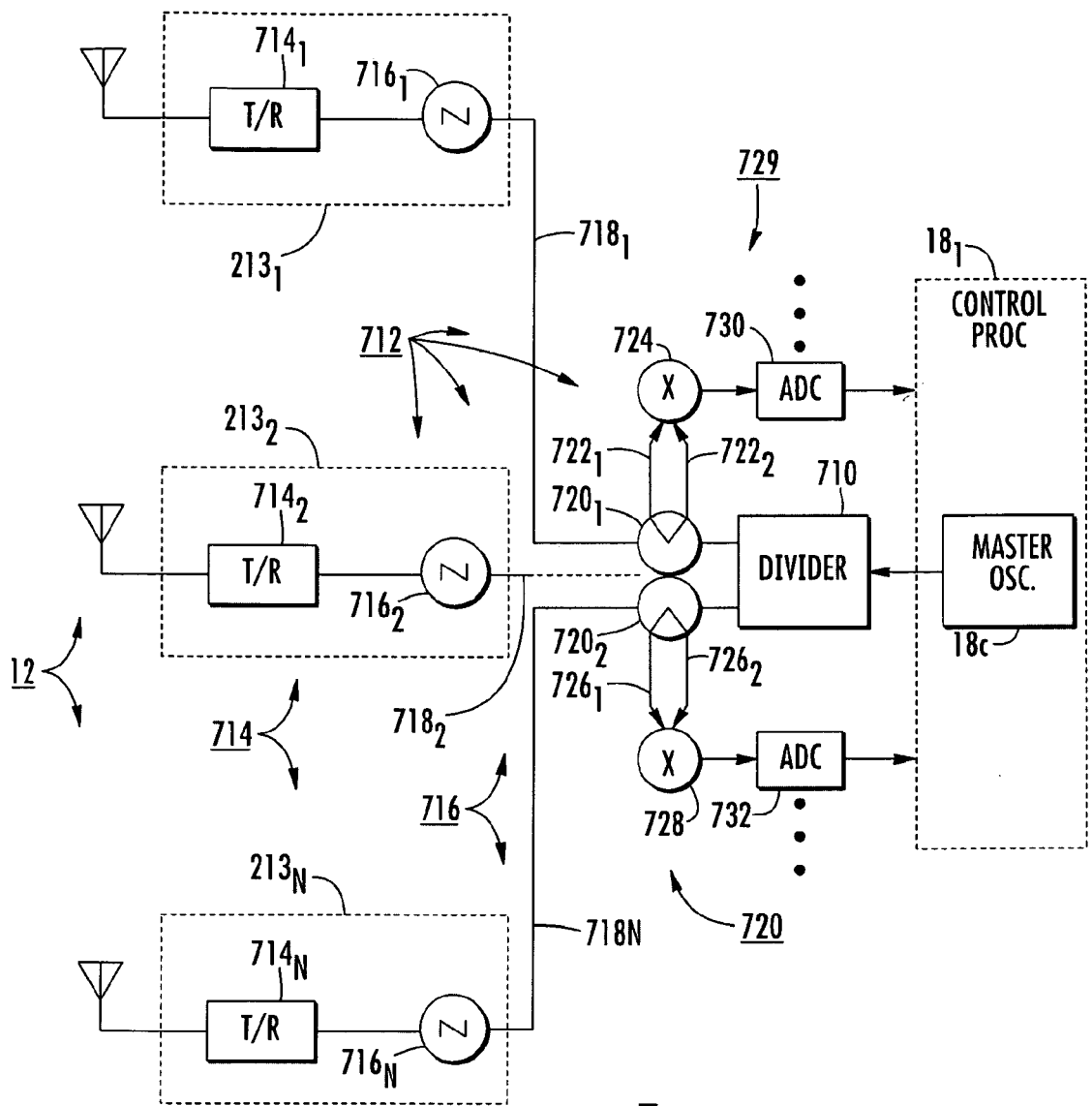
FIG. 7 is a simplified block diagram of a radar system generally similar to that of FIGS. 1 and 2, illustrating the sampling of the master oscillator signals and determination of at least the incremental transmission line length from phase error between forward and reflected master oscillator signals.

FIG. 7 is a simplified block diagram of a portion of a radar system according to an aspect of the invention, in which directional couplers or directional bridges are inserted into the analog clock signal transmission lines to aid in determining the electrical path lengths. Such length information is not needed in relation to transmission lines or signal paths which are exclusively digital, because the digital information inherently carries correction information. Thus, only the analog transmission lines or signal paths need to be measured and compensated for.

FIG. 7 is similar to portions of FIG. 2. In FIG. 7, the master oscillator 18c produces analog master oscillator signals, which are divided into plural portions in a power divider 710. The plural portions of the master oscillator or clock signal are applied from divider 710 to a plurality of analog transmission lines or signal paths designated generally as 712. Lines or paths 712 include all the analog signal transmission paths extending from output ports of divider 710 to the local oscillators $716_1$, $716_2$, ..., $716_N$ of set 716 of local oscillators. Thus, one of the transmission lines or signal paths 712 includes the main or "through" path of a bidirectional or dual directional coupler, bridge or sampler $720_1$ and transmission line or signal path $718_1$, and another one of the transmission lines or signal paths 712 includes the main or "through" path of a bidirectional coupler $720_2$ and a transmission line or signal path $718_N$. Other transmission lines or signal paths are included in the plurality of transmission lines or signal paths 712, as suggested by transmission line or signal path $718_2$.

Directional couplers and bidirectional couplers (and bridges) are well known in the art, and require no further explanation. The function of the directional coupler is to generate at a tap port a sample of the signal flowing in a particular direction through the "main" path of the coupler. This results in a reduction in the amplitude of the signal sample relative to the main path. Common levels of attenuation are 3 dB and 10 dB, but other values are often used. A bidirectional coupler may be viewed as simply being the cascade of two unidirectional couplers, each for sampling one direction of signal flow.

In the arrangement of FIG. 7, a sample of the forward signal in the path extending from divider 710 to local oscillator $716_1$ appears on signal path $722_1$, and a sample of the reverse or reflected signal from oscillator 7161 appears on signal path $722_2$. The two signal samples, forward and reverse, are applied to a phase detector illustrated as 724, and the phase difference appears as a direct voltage which is applied to an analog-to-digital converter (ADC) 730. Similarly, a sample of the forward signal in the path extending from divider 710 to local oscillator $716_N$ appears on signal path $726_1$, and a sample of the reverse or reflected signal from oscillator $716_N$ appears on signal path $726_2$. The two signal samples, forward and reverse, are applied to a phase detector illustrated as 728, and the phase difference appears as a direct voltage which is applied to an analog-to-digital converter (ADC) 732. It will be understood that there are as many bidirectional couplers and associated phase detectors and ADCs as there are analog transmission lines or signal paths extending from divider 710 to the local oscillators of set 716 of local oscillators.

The phase detected forward- and reverse-direction voltages, digitized by the ADCs of set 729 of ADCs, are applied from the set 729 of ADCs to control processor 18, to provide information about the measured lengths of the various transmission lines or signal paths. Thus, the current measured electrical length of each analog transmission line or signal path is known, and can be compensated for by the command processor in any known manner.

Those skilled in transmission lines and signal paths in conjunction with directional couplers know that the amplitude of an electromagnetic wave reflected from a load of any sort depends upon the impedance of the load relative to the characteristic or surge impedance of the transmission line or signal path. In theory, a load having an impedance equal to the characteristic impedance of the transmission line or signal path will reflect no energy, because all the incident energy will be absorbed by the load. In general, especially at VHF, UHF and microwave frequencies, impedances cannot be perfectly matched, and so there will always be a reflected wave in response to an incident wave. In order to provide a useful reflected signal sample, it may be desirable to select the input impedances of the local oscillators relative to the characteristic impedances of the transmission lines or signal paths. For example, in the case in which the transmission lines or signal paths have characteristic impedances of 50 ohms (a common value), the input impedances of the local oscillators may be set to 100 ohms.

A method according to an aspect of the invention is for synchronizing mutually separated first (18c) and second clocks (of set 620). The method comprises the steps of transmitting a first clock signal by way of an analog transmission line (of set 616 of transmission lines; 712) from the first clock (18c) to the second clock (of set 616 of clocks; 712), whereby at least a portion of the first clock signal is reflected from the second clock (of set 616 of clocks; 712) and propagates toward the first clock (18c) as a reflected first clock signal. At a location near the first clock (18c), the first clock signal and the reflected first clock signal in the transmission line (of set 616 of clocks; 712) are sampled to thereby produce sampled first clock signal and sampled reflected first clock signal. The propagation time of the transmission line (of set 616 of clocks; 712) is determined from the relative timing of the sampled first clock signal and the sampled reflected first clock signal. The second clock (of set 616 of clocks; 712) is set to be synchronous with the first clock signal as it appears at the location of the second clock (of set 616 of clocks; 712), minus the propagation time. In another mode of the method according to the invention, an apparatus is synchronized by the first and second clocks, and the operation of the apparatus is compensated for the propagation time of the transmission line. In one version, the step of sampling includes the step of providing a transmission line directional coupler or bridge (724) at the location near the first clock. The directional coupler (724) may be a bidirectional directional coupler.

A method according to another aspect of the invention is for synchronizing TR modules (of set 714 of TR modules) in a radar (10) using a phased-array antenna (12) in which each one of a plurality of local oscillators (of set 716 of local oscillators) controls the TR modules of a set (714) of TR modules. The method comprises the steps of coupling a master oscillator (18c) by way of a plurality of transmission lines (of a set 718 of transmission lines) to a like plurality of the local oscillators (of set 716 of local oscillators). A bidirectional directional coupler or bridge (such as $720_1$) is provided at locations along each of the plurality of transmission lines (of a set 718 of transmission lines), which locations are close to the master oscillator (18c). By way of the bidirectional directional couplers (of set 720 of directional couplers), master oscillator signals transmitted from the master oscillator (18c) to the local oscillators (of set 716 of local oscillators) are sampled, to thereby produce a forward master clock sample for each local oscillator. By way of the bidirectional couplers, reflected master oscillator signals which are reflected from the corresponding local oscillator are sampled, to thereby produce sampled reflected master oscillator signals for each of the local oscillators. The phase of the forward master clock sample is compared with the phase of the reflected master clock signal for each of the local oscillators (of set 716 of local oscillators), to thereby generate phase information representative of at least changes in the propagation time delay between the master oscillator (18c) and each local oscillator (of set 716 of local oscillators). The time delay information is provided to a radar processor (18) which controls the TR modules (of set 716 of local oscillators), and corrects the commands of the processor to each of the TR modules (of set 716 of local oscillators) to compensate for the effects of the time delay.

What is claimed is:

1. A method for synchronizing first and second clocks, said method comprising the steps of:
   transmitting a first clock signal by way of a transmission line from said first clock to said second clock, wherein at least a portion of said first clock signal is reflected from said second clock and propagates toward said first clock as a reflected first clock signal;
   at a location near said first clock, sampling said first clock signal and said reflected first clock signal in said transmission line to produce a sampled first clock signal and a sampled reflected first clock signal; and
   determining, from a relative timing of said sampled first clock signal and said sampled reflected first clock signal, a propagation time of said transmission line.

2. A method according to claim 1, further comprising the step of:
   setting said second clock synchronous with said first clock signal as it appears at the location of said second clock, minus said propagation time.

3. A method according to claim 1, wherein said step of sampling includes the step of providing a transmission line directional coupler or a directional bridge at said location near said first clock.

4. A method according to claim 3, wherein said directional coupler or bridge is a bidirectional directional coupler or bridge.

5. A method for operating an apparatus synchronized by first and second clocks, said method comprising the steps of:
   transmitting a first clock signal by way of a transmission line from said first clock to said second clock, wherein at least a portion of said first clock signal is reflected from said second clock and propagates toward said first clock as a reflected first clock signal;
   at a location near said first clock, sampling said first clock signal and said reflected first clock signal in said transmission line to produce a sampled first clock signal and a sampled reflected first clock signal;
   determining, from the relative timing of said sampled first clock signal and said sampled reflected first clock signal, a propagation time of said transmission line;
   setting said second clock synchronous with said first clock signal as it appears at the location of said second clock; and
   compensating operation of said apparatus for said propagation time.

6. A method for synchronizing TR modules in a radar using a phased-array antenna in which each one of a plurality of local oscillators controls the TR modules of a set of TR modules, said method comprising the steps of:
   coupling a master oscillator by way of a plurality of transmission lines to a plurality of said local oscillators;
   providing a bidirectional coupler at locations along each of said plurality of transmission lines, which locations are close to said master oscillator;
   by way of said bidirectional coupler, sampling master oscillator signals transmitted from said master oscillator to said local oscillators to produce a forward master clock sample for each local oscillator;
   by way of each of said bidirectional couplers, sampling reflected master oscillator signals which are reflected from the corresponding local oscillators, to produce sampled reflected master oscillator signals for each of said local oscillators;
   comparing a phase of each forward master clock sample with a phase of the reflected master clock signal for each of said local oscillators, to generate phase information representative of a propagation time delay between the master oscillator and each local oscillator; and
   providing said time delay information to a radar processor which controls the TR modules, and correcting the commands of said processor to each of said TR modules to compensate for effects of said time delay.

7. A system for synchronizing mutually separated first and second clocks, said system comprising:
   a processor executing instructions for performing the steps of:
      transmitting a first clock signal by way of a transmission line from said first clock to said second clock, wherein at least a portion of said first clock signal is reflected from said second clock and propagates toward said first clock as a reflected first clock signal;
      at a location near said first clock, sampling said first clock signal and said reflected first clock signal in said transmission line to produce a sampled first clock signal and a sampled reflected first clock signal; and
      determining, from a relative timing of said sampled first clock signal and said sampled reflected first clock signal, a propagation time of said transmission line.

8. A system according to claim 7, wherein the processor executes instructions for setting said second clock synchronous with said first clock signal as it appears at the location of said second clock, minus said propagation time.

9. A system according to claim 7, further comprising a transmission line directional coupler or a directional bridge at said location near said first clock.

10. A system according to claim 9, wherein said directional coupler or bridge is a bidirectional directional coupler or bridge.

* * * * *